United States Patent [19]

Nakamura et al.

[11] 4,259,096
[45] Mar. 31, 1981

[54] FUEL VAPOR ADSORPTION TYPE AIR CLEANER ELEMENT FOR INTERNAL COMBUSTION ENGINE

[75] Inventors: Yasuhiko Nakamura, Toyohashi; Yoshio Yamakawa, Toyota, both of Japan

[73] Assignee: Nippondenso Co., Ltd., Kariya, Japan

[21] Appl. No.: 4,190

[22] Filed: Jan. 17, 1979

[30] Foreign Application Priority Data

Jan. 19, 1978 [JP] Japan .................................. 53-4873

[51] Int. Cl.³ .......................................... B01D 50/00
[52] U.S. Cl. ....................................... 55/316; 55/498; 55/510; 55/524; 55/486; 55/527; 156/325; 156/306.6; 156/307.5; 156/331
[58] Field of Search ................ 55/316, 486, 487, 510, 55/524, 528; 156/325, 306.6, 307.5, 331

[56] References Cited

U.S. PATENT DOCUMENTS

| | | | |
|---|---|---|---|
| 3,477,210 | 11/1969 | Heruert | 123/136 |
| 3,563,828 | 2/1971 | Marshall | 55/528 |
| 3,675,403 | 7/1972 | Ruffo | 55/524 |
| 3,727,597 | 4/1973 | Hensler | 55/316 |
| 4,046,525 | 9/1977 | Matsuo et al. | 55/316 |
| 4,130,487 | 12/1978 | Hunter et al. | 55/521 |

FOREIGN PATENT DOCUMENTS

| | | | |
|---|---|---|---|
| 2512659 | 5/1976 | Fed. Rep. of Germany | 55/316 |
| 1322718 | 7/1973 | United Kingdom | 55/487 |

Primary Examiner—Bernard Nozick
Attorney, Agent, or Firm—Cushman, Darby & Cushman

[57] ABSTRACT

An air cleaner element for an internal combustion engine capable of adsorbing fuel vapor and having an air cleaning filter medium and a fuel vapor adsorption filter medium containing activated carbon fibers, the filter media being partly bonded together with an adhesive into a unitary construction. Both the filter media have a large surface area so that the reduction in size of the air cleaning filter medium and the increase in size of an air cleaner case may not be needed. Furthermore the wear and abrasion of activated carbon fibers due to the vibrations may be avoided.

4 Claims, 8 Drawing Figures

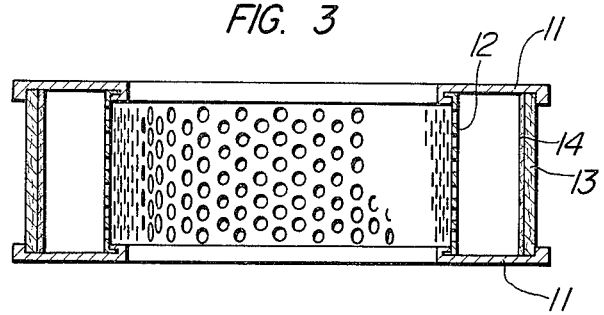
FIG. 3
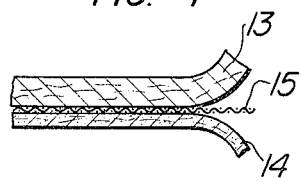
FIG. 4
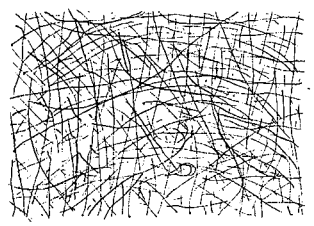 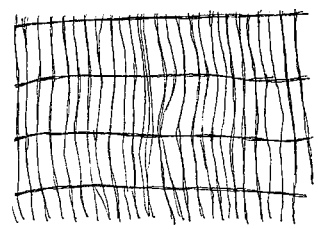
FIG. 5a       FIG. 5b
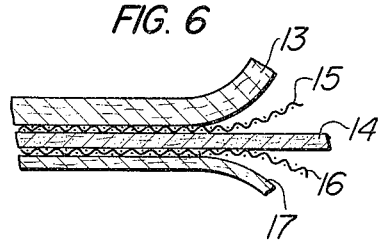
FIG. 6
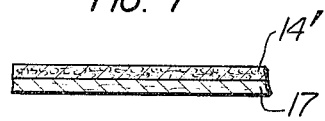
FIG. 7

FUEL VAPOR ADSORPTION TYPE AIR CLEANER ELEMENT FOR INTERNAL COMBUSTION ENGINE

BACKGROUND OF THE INVENTION

1. Field of the Invention

The present invention relates to an air cleaner element capable of adsorbing fuel vapor generated in a carburetor and an intake manifold of an internal combustion engine, thereby preventing the emission of hydrocarbons into the surrounding atmosphere.

2. Brief Description of the Prior Art

So far there have been invented and demonstrated various types of air cleaners. In an air cleaner (1), a layer of activated carbon particles is securely attached to the interior surface of an air cleaner element comprising an air cleaning filter medium. In an air cleaner (2), a carbon element which contains activated carbon particles is located inside an air cleaning filter medium and spaced apart therefrom by a suitable distance. In an air cleaner (3), activated carbon particles are filled in an air intake pipe to the air cleaner.

When the activated carbon particles are incorporated into the air cleaners of the types (1), (2) and (3) and when the air cleaner is mounted on the carburetor, vibrations cause the wear and abrasion of the activated carbon particles so that finely divided activated carbon particles adhere to the carburetor, thereby adversely affecting the function thereof.

In the case of the air cleaners (1) and (2) wherein the layer of activated carbon particles is disposed within the air cleaner, it is required to provide a space sufficient to contain a volume of activated carbon particles required for adsorbing the fuel vapor. As a result, an air cleaner case must be increased in size. In the case of the air cleaner (2), the air cleaning filter medium must be reduced in size. It is difficult to increase the air cleaner case in size because of the space available in an engine room where other components also must be mounted. The reduction in size of the air cleaning filter medium cannot be allowed because of the resulting decrease in air cleaning capability. In order to effect the complete adsorption and desorption of the fuel vapor, the layer of activated carbon particles must be arranged in such a way that it may interfer with the flow of air. As described above, a sufficient surface area of the activated carbon particle layer cannot be obtained so that the velocity of air passing through the activated carbon particle layer increases when the engine is operating, thus resulting in the increase in resistance to the air flow and consequently the drop in the engine output.

Furthermore, the air cleaners (1), (2) and (3) are all complicated in construction and present the cost problem.

SUMMARY OF THE INVENTION

The present invention was made to overcome the above and other problems encountered in the prior art air cleaners. Accordingly, a first object of the present invention is to provide a fuel vapor adsorption type air cleaner element for use in an internal combustion engine which may eliminate the needs of reducing in size of an air cleaning filter medium and of increasing in size of an air cleaner case.

A second object of the present invention is to provide an air cleaner element of the type described above which may further prevent the wear and abrasion of activated carbon due to vibrations.

A third object of the present invention is to provide an air cleaner element of the type described above which is simple in construction and inexpensive to manufacture.

The present invention provides a fuel vapor adsorption type air cleaner element for use in an internal combustion engine of the type for cleaning the air to be drawn into the combustion chamber or chambers of said internal combustion engine, characterized in that said air cleaner element has an intake air cleaning filter medium and a fuel vapor adsorption filter medium which contains activated carbon fibers for adsorbing the fuel vapor; and said both filter media are partly bonded to each other into a unitary construction.

The above and other objects, features and advantages of the present invention will become more apparent from the following description of preferred embodiments thereof taken in conjunction with the accompanying drawings.

BRIEF DESCRIPTION OF THE DRAWINGS

FIG. 3 is a sectional view taken along the line III—III of FIG. 2;

FIG. 4 is a fragmentary sectional view of the air cleaner element shown in FIGS. 2 and 3;

FIGS. 5a and 5b are top views of gauze-like, solid adhesives used in the air cleaner elements in accordance with the present invention;

FIG. 6 is a fragmentary sectional view of another embodiment of an air cleaner element in accordance with the present invention; and FIG. 7 is a fragmentary sectional view of a further embodiment of an air cleaner element of the present invention.

DESCRIPTION OF THE PREFERRED EMBODIMENTS

Figure 1:
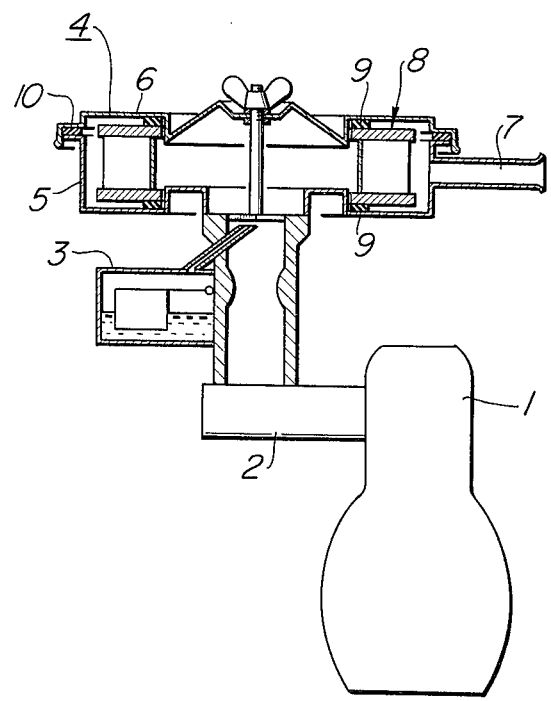
FIG. 1 is a fragmentary sectional view illustrating an air cleaner element of the present invention mounted on an internal combustion engine.

The present invention will be described with reference to the accompanying drawings showing embodiments of automotive air cleaner elements. Referring to FIGS. 1-4, 1 denotes an internal combustion engine; 2, an intake manifold; 3, a carburetor; 4, an air cleaner comprising a case 5, a cap 6, an inlet tube 7, an air cleaner element 8, an element gasket 9 and a case gasket 10; 11, end plates of the air cleaner element 8 made up of vinyl chloride, urethane resins or iron plates and an adhesive; 12, a protector made of a perforated steel plate or a wire gauze; 13, a filter medium for cleaning air made of non-woven fabric or filter paper; and 14, a black and paper-like filter medium which is solely made of activated carbon fibers or made by mixing activated carbon fibers and cellulose fibers or synthetic fibers.

Fibers of activated carbon (to be referred to as "activated carbon fibers" hereinafter in this specification) which constitutes the filter medium 14 is produced for instance in the following manner. That is, synthetic fibers such as rayon and natural fibers such as pulps are baked to carbonize them. Carbonized fibers are then partly oxidized into activated carbon in the form of fibers. The fibers are untwisted and combined with for instance pulps, thereby forming the filter medium 14 containing the activated carbon fibers.

15 is a solid adhesive in the form of gauze of fibers as, for example, shown in FIGS. 5a and 5b. The adhesive 15 is made of a thermally meltable polyamide which melts at the order of 250° C. Overlaid over the air cleaning filter medium 13 through the gauze-like, thermally meltable type adhesive 15 is the filter medium 14 which is same in size as the filter medium 13 and which contains the activated carbon fibers, and they are heated while being applied with a pressure. Then the adhesive 15 is melted so that a one-piece filter medium may be provided. Since the adhesive 15 is in the form of gauze, the adhesion between the filter media 13 and 14 is partial so that the increase in resistance to air flow and the decrease in fuel vapor adsorptivity will not result. The service life as well as the filter efficiency of the air cleaner element 8 are dependent upon the filter medium 13 which cleans the air to be drawn. The fuel vapor adsorption capability is dependent upon the filter medium 14 which contains the activated carbon fibers. The resistance to air flow is dependent on both the filter media 13 and 14. Therefore it is preferable to locate the air cleaning filter medium 13 at the upstream of the filter medium 14 which contains the activated carbon fibers in order to protect the filter medium 14 and to locate the filter medium 14 containing the activated carbon fibers at the downstream. The filter medium 14 which contains the activated carbon fibers is intended to adsorb fuel vapor so that it is preferable that the filter medium 14 be made as coarse as possible, thereby reducing the resistance to air flow. The one-piece assembly of the air cleaning filter medium 13 and the filter medium 14 which contains the activated carbon fibers is arranged in the V-shaped pleats as shown in FIG. 2.

The contaminated air is drawn through the intake pipe 7, cleaned by the filter medium 13 of the air cleaner element 8 and further drawn into the combustion chambers of the internal combustion engine 1. Fuel vapor which has been generated in the intake manifold 2 and the carburetor 3 is adsorbed by and trapped on the filter medium 14 of the air cleaner element 8. Thus adsorbed and trapped fuel vapor is entrained by the cleaned air and drawn into the combustion chambers when the internal combustion engine 1 is operating. As a result, the emission of vapor of fuel into the surrounding atmosphere is avoided.

Figure 2:
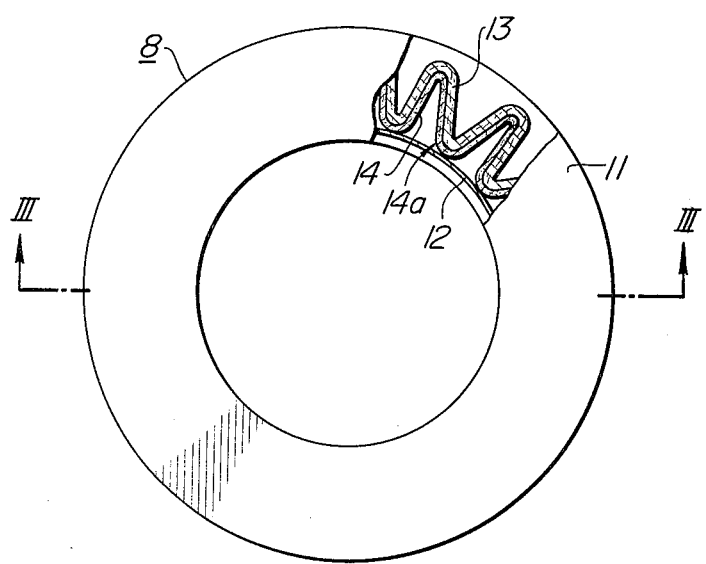
FIG. 2 is a fragmentary horizontal sectional view of an embodiment of an air cleaner element in accordance with the present invention.

When, as shown in FIG. 2, the filter medium 14 which contains the activated carbon fibers is arranged into the V-shaped pleats while it is exposed, and constitutes the air cleaner element 8, the fracture of the filter medium 14 occurs at a pleated portion 14a. In order to avoid the fracture of the filter medium 14, as shown in FIG. 6, a thin, protective filter medium 17 made of nonwoven fabric may be bonded over the filter medium 14, which contains the activated carbon fibers, with a gauze-like, thermally meltable polyamide adhesive 16 as shown in FIGS. 5a and 5b. Instead of bonding together the filter media 14 and 17 with the adhesive 16, the filter medium 14, which contains the activated carbon fibers, may be formed over the protective filter medium 17.

Alternatively, the activated carbon fibers, the synthetic fibers such as rayon fibers and the natural fibers such as pulps are mixed in a water soluble adhesive. The mixture is formed into a web, thereby providing a filter medium 14' including the activated carbon fibers and the adhesive. The filter medium thus provided is overlaid over a protective filter medium 17 in the form of a web and pressed against it, as shown in FIG. 7. Thereafter, the lamination is heated and dried, and both the filter media are bonded together with the adhesive which is contained in the first mentioned filter medium.

Instead of the gauze-like, thermally metable fiber adhesive 15, a liquid adhesive (a polyamide series) may be applied in the form of gauze, and the above-mentioned media may be pressed and bonded thereby to provide the air cleaner element 8.

It is to be understood that the present invention is not limited to the embodiments thereof described above and that various modifications may be effected as needs demand as will be described below.

(1) It is not necessarily required to arrange the air cleaner element 8 into the V-shaped pleats. It may be in the form of a plate by increasing the thickness of the air cleaning filter medium 13.

(2) The guaze-like, thermally meltable fiber adhesives 15 and 16 may be prepared from other adhesives than polyamide adhesives, but the adhesives used must be such that it melts at a low temperature at which the air cleaning filter medium 13 will not burn.

(3) In addition to the automotive internal combustion engines with the carburetors 3, the air cleaner element 8 in accordance with the present invention may be equally used in the automotive internal combustion engines with electronic type fuel injection systems. Furthermore, it may be also used in the internal combustion engines for motorcycles and agricultural machines.

(4) The air cleaning filter medium 13 and the filter medium 14, which contains the activated carbon fibers, have been described as being securely bonded together with the thermally meltable adhesive 15. Alternatively, the raw materials of the filter medium 13 such as rayon, vinylon and tetron fibers are mixed with thermally meltable, thermoplastic fibers such as unstretched polyester fibers and the mixture is formed into the filter medium 13. The filter medium 14 is overlaid over the filter medium 13 and pressed against it while being heated so that the thermally meltable, thermoplastic fibers in the filter medium 13 are melted to bond the filter media 13 and 14 together. It is required that the raw materials of the filter medium 13 will not melt up to a melting point of the thermally meltable, thermoplastic fibers.

(5) It is not needed to bond the filter medium 14, which contains the activated carbon fibers, to the whole surface of the air cleaning filter medium 13. A suitable number of small pieces of filter medium 14 may be bonded over the major surface of the filter medium 13.

As described above, the filter medium 14, which contains the activated carbon fibers, is partially bonded to the air cleaning medium 13 into the one-piece construction air cleaner element 8. Therefore, the filter medium 14, which contains the activated carbon fibers, may have the same wide surface as the air cleaning filter medium 13. As a result, the thickness may be reduced without increasing the thickness in order to enlarge the surface so that the filter medium, which contains a required amount of activated carbon fibers, may be integrated without reducing in size the air cleaning filter medium 13 so as to reduce its surface. As a consequence, the prior art problem that the air cleaning capability is decreased by the reduction in size of the air cleaning filter medium and the problems resulting from the enlargement of the air cleaner cases 5 and 6 in order to increase the volume of activated carbon may be simultaneously eliminated. The filter medium 14, which contains the activated carbon fibers, has a large surface area so that the fuel adsorption and desorption velocities may be increased. As a result, even under the conditions of frequently starting and stopping the engine, the emission of fuel vapor may be satisfactorily avoided. Furthermore, the present invention uses the filter medium 14, which contains the activated carbon fibers so that, contrary to the prior art, there will never occur the problem that vibrations accelerate the wear of the activated carbon particles, thereby adversely affecting the performance of the carburetor 3.

In addition, the air cleaning filter medium 13 and the filter medium 14, which contains the activated carbon fibers are partly bonded to each other so that no appreciable increase in resistance to the air flow occurs. Furthermore, the construction is simple so that the manufacturing cost is low.

What is claimed is:

1. An annular fuel vapor adsorption air cleaner element for use with an internal combustion engine for cleaning air drawn into the combustion chamber or chambers of said internal combustion engine, said element comprising an intake air cleaning filter medium and a fuel vapor adsorption filter medium which contains activated carbon fibers for adsorbing fuel vapors, said air cleaning and vapor filter media being formed from non-woven fibrous webs and bonded together along predetermined portions into a unitary structure by a melted annular gauze mesh consisting essentially of a thermoplastic adhesive with said intake air cleaning filter medium being located outwardly from said fuel vapor a sorption filter medium and having a concentric relationship with each other, and the bonded portions lying between said filter media.

2. An air cleaner element as set forth in claim 1 wherein said gauze-like adhesive is an adhesive made up of fibers which are thermally meltable.

3. An air cleaner element as set forth in claim 1 further including a thin protective filter medium bonded to the other side of said fuel vapor adsorption filter medium at predetermined points by a gauze-like, thermally meltable adhesive.

4. An air cleaner element as set forth in claim 1 wherein said fuel vapor adsorption filter medium is formed by mixing activated carbon fibers, synthetic and natural fibers and a water soluble adhesive in water, and thereafter forming the mixture thus obtained into the form of a web or sheet, overlaying the thus obtained web or sheet over a protective filter medium prepared in the form of a web or sheet, pressing the two overlayed layers together, heating and drying them, and bonding them together.

* * * * *